(12) United States Patent
Dhingra et al.

(10) Patent No.: US 11,868,416 B1
(45) Date of Patent: Jan. 9, 2024

(54) ENVIRONMENT AGNOSTIC LOAD GENERATION

(71) Applicant: Workday, Inc., Pleasanton, CA (US)

(72) Inventors: Sandeep Dhingra, Mountain View, CA (US); Tara Sudarshan, Livermore, CA (US); Abhishek Karpate, Dublin, CA (US)

(73) Assignee: Workday, Inc., Pleasanton, CA (US)

( * ) Notice: Subject to any disclaimer, the term of this patent is extended or adjusted under 35 U.S.C. 154(b) by 150 days.

(21) Appl. No.: 17/518,017

(22) Filed: Nov. 3, 2021

(51) Int. Cl.
*G06F 16/9535* (2019.01)
*G06F 16/958* (2019.01)
*G06F 16/9538* (2019.01)

(52) U.S. Cl.
CPC ........ *G06F 16/9535* (2019.01); *G06F 16/958* (2019.01); *G06F 16/9538* (2019.01)

(58) Field of Classification Search
CPC .. G06F 16/951; G06F 16/953; G06F 16/9532; G06F 16/9535; G06F 16/9536; G06F 16/9538; G06F 16/958
See application file for complete search history.

(56) References Cited

U.S. PATENT DOCUMENTS

| | | | |
|---|---|---|---|
| 11,550,787 B1* | 1/2023 | Hernich | G06F 16/24539 |
| 2017/0124487 A1* | 5/2017 | Szeto | G06F 11/1448 |
| 2018/0157724 A1* | 6/2018 | Kinsely | G06F 16/254 |
| 2022/0058114 A1* | 2/2022 | Ranjan Jena | G06N 20/00 |

* cited by examiner

*Primary Examiner* — Kris E Mackes
(74) *Attorney, Agent, or Firm* — Van Pelt, Yi & James LLP

(57) ABSTRACT

The present application discloses a method, system, and computer system for running a test in a database system. The method includes obtaining, by one or more processors associated with a server, a template comprising one or more variables, storing, in a cache, a mapping of field definitions for a particular dataset, populating, by the one or more processors, the template to generate a populated template based at least in part on the mapping of field definitions for the particular dataset, performing, by the one or more processors, a query with respect to the particular dataset using values obtained from the populated template, and monitoring, by the one or more processors, one or more performance characteristics associated with the performing the query.

20 Claims, 7 Drawing Sheets

400

```
{
"data_Source_id": "a07a5944a414018584a0002315006401",  → ${id0}
        "filters": [
        {
                "Cmp":"between"
                "column": "Record_Date",
                "value":[
                        "2000-01-01", "2020-01-01"
                ],
                "isExclusion":false
        }
],
"field_Definitions":{
        "Organization":"a07a5944a41401c77076e12016005902"  → ${id1}
        "Record Date": "a07a5944a41401c77076e12016007003"  → ${id2}
}
"measure_Definitions":{
        "Total Records": "COUNT()"
        "Average(Annual Base Pay)":
        AVG(f91d3cb59271014d37b9eee0c009829)",  → ${m_id0}
        "Minimum(Annual Base Pay"):
        MIN(f91d3cb59271014d37b9eee0c009829)",  → ${m_id1}
        "Sum(Annual Base Pay int)":
        SUM(f91d3cb59271012ec3a33eee0c009729)",  → ${m_id2}
}
"axes":[
{
"name":"column",
"sortType": "field_values",
"fields":[
        {
        "field":"Organization",
        "sort":"ASC"
        }
]
}
]
"measures":[
        "TotalRecords"
[
}
```

FIG. 4

ENVIRONMENT AGNOSTIC LOAD GENERATION

BACKGROUND OF THE INVENTION

A system for big data processing comprises a system for receiving data, storing data, processing data, etc. Big data processing systems typically comprise a large number of elements in one or more datasets. The one or more data sets are accessed by users associated with an organization. For example, users may input queries to a client terminal, and the queries are performed by the system for data processing. At scale, the number of accesses or queries performed against the one or more datasets is very large. For example, for large organizations, the number of transactions (e.g., queries) performed against the one or more datasets can exceed five million transactions per day. The size of datasets and the number of queries at scale causes organizations to seek configurations of datasets and environments that optimize processing of queries. Running tests against one or more datasets in a manner that is agnostic to the configurations of the environment may be beneficial to provide performance evaluation and benchmarking across different datasets and environments.

BRIEF DESCRIPTION OF THE DRAWINGS

Various embodiments of the invention are disclosed in the following detailed description and the accompanying drawings.

FIG. 4 is a diagram of an example of a payload according to various embodiments of the present application.

DETAILED DESCRIPTION

Figure 1:
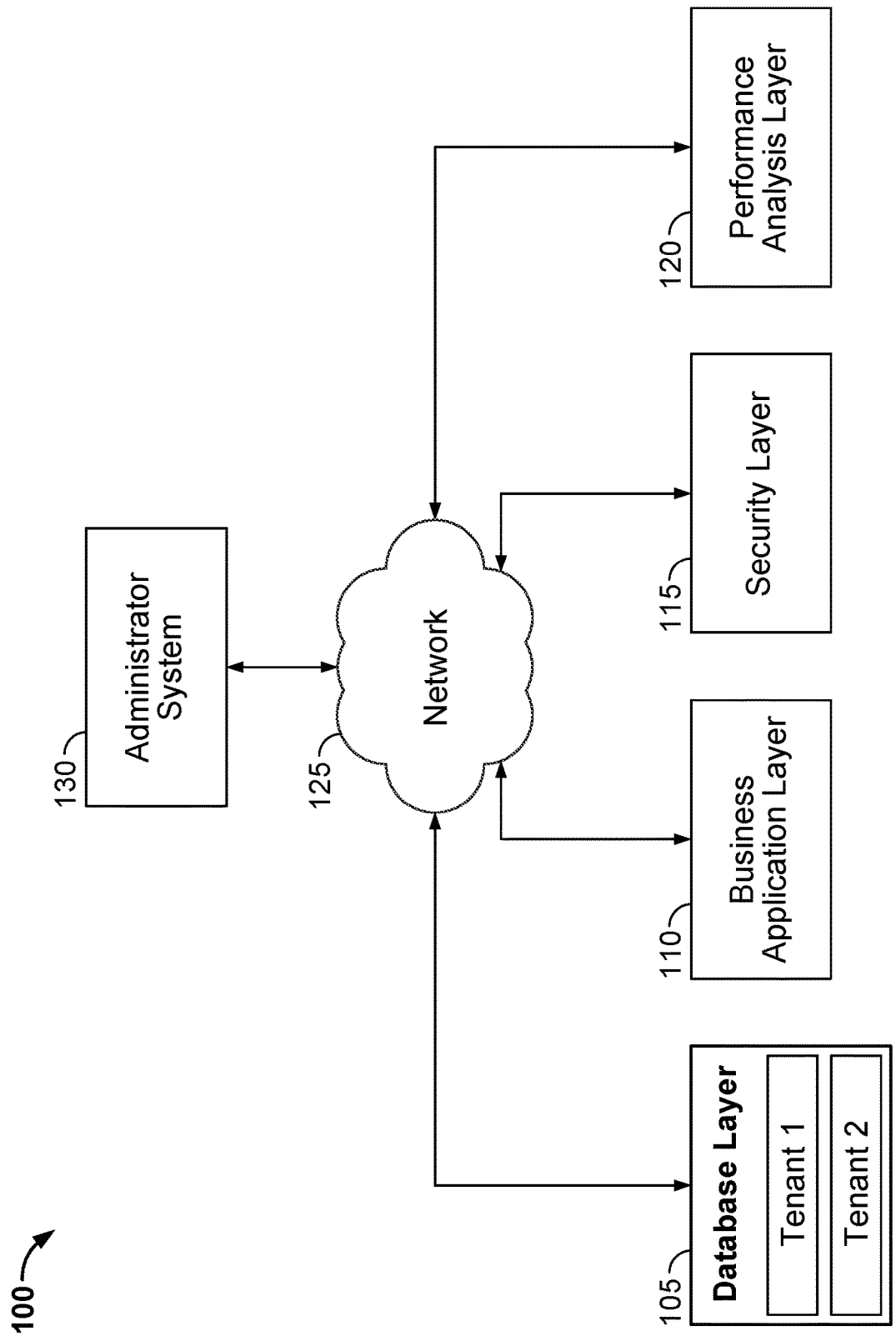
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a tenant may be an organization associated with a database (or dataset), such as a client of a software as a service provider. The tenant may be a company, a government entity, a sub-organization (e.g., a department, business unit, etc.), or other appropriate organization, etc. Each tenant may be comprised in a computing environment (also referred to herein as an "environment"). Each tenant may be architecturally unique, and each environment may have different computing resources with a particular configuration. An environment may comprise one or more tenants.

A system and method for testing performance of a database or corresponding environment in which the database operates is disclosed. In some embodiments, the testing the performance of a database comprises generating a test load (or causing a test load to be generated) on the database (e.g., the database being tested, or a database located on an environment being tested). The generation of the test load (also referred to herein as the load) is agnostic to a particular environment and/or tenant in which the database to run the test load is located. For example, the test load can be deployed to various different databases and/or various different environments, and run on an applicable database in connection with performance testing the database or environment.

A system for testing performance of a test query is disclosed. The test system comprises one or more processors and a memory coupled to the processor and configured to provide the one or more processors with instructions. The one or more processors are configured to obtain a template comprising one or more variables, store, in a cache, a mapping of field definitions for a particular dataset, populate, by the one or more processors, the template to generate a payload based at least in part on the mapping of field definitions for the particular dataset, perform a query with respect to the particular dataset based at least in part on values obtained from the payload, and monitor one or more performance characteristics associated with the performing the query. In some embodiments, the one or more processors are further configured to report (e.g., generate and provide a report) at least one of the one or more performance characteristics. The mapping of field definitions for a particular dataset may be stored in a mapper library.

Generally, related art systems and methods for testing/evaluating performance of one or more datasets is inefficient and labor intensive because of the framework for generating a load to be put on a dataset to be tested is not extensible across varying databases, varying tenants, or varying environments in which the databases are deployed. Evaluation of a test load to be generated on a database requires, generally, the test to be specifically configured for the database, tenant, and/or environment in which the test load is to be deployed for evaluation. An example of a configuration used to run the test load is the field definitions for the dataset against which the test load is to be evaluated. However, because each dataset generally has unique field definitions, related art test loads are configured to make calls to the dataset to obtain the applicable field definitions. Accordingly, evaluation of a test load to be generated on a dataset requires the test to be specifically configured for the dataset by making calls to the database layer each time the applicable field definition value is to be used in the test. In some tests, metadata corresponding to field definitions for thousands of fields are obtained. The process of making individual calls to the database layer for the applicable field definitions is time consuming, creates bottlenecks in the target system, and generally obscures measurement of the performance of the dataset and/or environment (e.g., the retrieval of the field definitions from the database layer is not performed in real time because of delays such as the associated retrieval to the database layer). Another example of the configuration used to run the test load is the architecture and computing resources within an environment in which the dataset being tested is located. According to related art systems and methods for testing performance of a dataset or environment, the test load is manually configured to be able to run on the applicable environment.

According to various embodiments, a payload is generated based at least in part on (i) one or more characteristics pertaining to a dataset against which a load is to be tested, (ii) one or more characteristics pertaining to a tenant on which the dataset is located, and/or (iii) one or more characteristics pertaining to the environment on which the tenant is deployed. In some embodiments, the payload corresponds to a test load that is to be deployed to a plurality of databases in connection with testing performances of the test load across different databases. The payload may be deployed to target systems that are in a testing or in a sandbox environment, and/or to target systems that are running a system/database in production (e.g., that is servicing customer queries, etc.). The performance of the test load may be monitored such as to obtain one or more performance characteristics associated with processing the load (e.g., the query corresponding to the load). For example, the test system may monitor performance of the test load with respect to one or more datasets. In some embodiments, the one or more performance characteristics comprise statistical information or statistical criteria. Examples of the statistical information includes an indication of a maximum value, a minimum value, a mean, a standard deviation, a value for the $50^{th}$ percentile, a value for the $75^{th}$ percentile, a value for the $95^{th}$ percentile, and a value for the $99^{th}$ percentile. In some embodiments, the system is configured to determine whether at least one performance characteristic of the one or more performance characteristics satisfies one or more statistical criteria; and in response to determining that the at least one performance characteristic satisfies the one or more statistical criteria, cause an administrator system to be alerted. In some embodiments, causing the administrator system to be alerted comprises communicating an indication that the at least one performance characteristic satisfies the one or more statistical criteria to a terminal or system associated with an administrator or a user.

In some embodiments, the test (e.g., corresponding payloads to cause generation of test loads) may be driven to a test group of target systems (e.g., database layers such as with varying datasets, tenants, and/or environments). As an example, a test may be a part of a test plan (e.g., such as in connection with a benchmarking plan) in which a set of tests are driven to the test group of target systems. The test group of target systems may comprise a system that is newly deployed and/or a system that is already operating (e.g., is not newly deployed but has been operating for at least predetermined period of time or that has processed a predetermined number of queries). In some embodiments, the set of tests is selected/configured in a manner such that the set of tests comprises a variety of tests that test different features or functionality in the target system. For example, the set of tests may comprise a variety of tests that correspond to different functions (e.g., queries, a calculation, etc.). As another example, the set of tests may comprise different types of queries. Examples of tests include measuring a response from different types of application peripheral interfaces (APIs) (e.g., a streaming API, a data discovery API, etc.). A variety of tests may be deployed to a same API to test different types of workloads (e.g., a slim test modelling a light test load, a heavy duty test modelling a heavy test load). The set of tests may be selected to enable an analysis to isolate the performance of different components of the target system. For example, the set of tests may be selected to enable the test system to determine whether performance degradation is caused by hardware, third-party software (e.g., and if so, an identification of such third-party software), a software internally developed, a new feature, a re-architecture, etc.

In some embodiments, the test system provides an analysis (e.g., a comparison, benchmarking, etc.) of the performance of the test across a plurality of datasets, tenants, and/or environments to which the test was deployed. Different configurations of a target system (e.g., a dataset, a database layer, a tenant, an environment, etc.) can cause or lead to different efficiencies or inefficiencies with respect to data access, processing, and/or network access. Accordingly, the performance of the test and/or analysis of the performance of the test may be used in connection with determining desirable and/or undesirable configurations. For example, the test may be implemented in connection with optimizing or improving a configuration of a target system.

According to various embodiments, the analysis of the performance of the test may enable a user or system to analyze the scalability of a service (e.g., a set of datasets, etc.) across multiple tenants. For example, the analysis of the performance may allow the system to isolate configurations that are impeding scalability (e.g., identify a particular configuration of the dataset, database, tenant, and/or environment that causes a processing time to be relatively long such as compared to other configurations). As another example, the analysis of the performance may allow the test system to determine whether performance with respect to an implementation (e.g., an implementation of a dataset, database, tenant, and/or environment) degrades over time, as code is added to the corresponding target system, and/or as the implementation is scaled (e.g., scaled with respect to a number of queries processed, a number of entries in the database, a size of the database, etc.). The analysis of the performance may allow the test system to isolate a cause of any such degradation. In some embodiments, the test is implemented at a target system according to a test plan. As an example, the test plan may comprise an indication of a period of time according to which the test is repeated.

According to various embodiments, the analysis of the performance of the test may enable a user or system to track performance of a target system over time. For example, a median response (e.g., response time) may be tracked over time, and the system may determine when the performance deviates from the median (e.g., when the response spikes relative to the median response). In response to determining that a current performance deviates more than a threshold value or threshold percentage from the median, a notification may be generated and provided (e.g., to an administrator, a developer, etc.). The analysis of the performance of the test may include identifying an association between a change in the target system and a change in the performance (e.g., if performance changes in response to, or relatively soon after, an API is updated, a dataset is reconfigured, variability of code, a change in hardware, etc.). As another example, a remedial action is performed or recommended in response to a determination that the performance of the test satisfies one or more thresholds (e.g., if a latency for a particular request is longer than a latency threshold, etc.).

According to various embodiments, a test and/or test plan is configured to isolate and exclude (e.g., substantially) elements that may require resources or create overhead, but that are not desired to be tested. For example, in order to measure the performance of a target system (e.g., a configuration of a system such as a deployment of a dataset, tenant, etc.), the measure of the performance should exclude overhead or other functions or processes that do not pertain to the performance of the deployment. In some embodiments, the test and/or test plan is configured to isolate only elements of the target system that are to be subject to performance evaluation. As an example, the test and/or test plan may be configured to exclude from the performance evaluation a retrieval of certain information from a dataset. An example of information for which retrieval is to be excluded from performance evaluation may be field definitions for information stored in the dataset. In some embodiments, the retrieval of certain information from a dataset is isolated and excluded from the performance evaluation by obtaining such information and storing such information in cache. Accordingly, when running the test, the information that has been isolated and excluded from performance evaluation is obtained from cache (e.g., rather than from the database layer). Therefore, the retrieval of such information from the database layer is not captured or included in the one or more performance metrics obtained while monitoring the performance of the test. For example, the retrieval of such information from the cache is performed nearly in real-time and is not materially significant in the overall performance of the test.

According to various embodiments, in connection with implementing a test plan, a test system selects (e.g., determines) one or more tests to be run, and one or more target systems that are to run the one or more tests (e.g., the one or more systems that are to be tested, such as one or more database layers, tenants, environments, etc.). In response to determining the one or more tests to be run, and the one or more target systems that are to be tested, a test program is communicated to the one or more target systems. In some embodiments, the test program comprises one or more templates corresponding to the one or more tests to be run. For example, a template may be pre-configured based at least in part on the test (e.g., the template may be pre-configured to be used as part of a query or a function after being populated, etc.). The template may be pre-configured to correspond to a test load such that use of the template to generate a payload will cause the test load to be generated at the corresponding target system. In some embodiments, the template is pre-configured to be agnostic with respect to the tenant and/or environment on which the corresponding test is to be implemented. The template is used in connection with generating a payload that is to implement testing the corresponding target system. For example, the template is populated based at least in part on one or more configurations associated with the target system (e.g., one or more field definitions of a dataset of the target system, a configuration of the environment of the target system, credential information to access the dataset of the target system, etc.). In some embodiments, the payload generated using the template is in a JavaScript Object Notation (JSON) format. In some embodiments, the payload may comprise authentication credentials (e.g., credentials associated with the dataset with respect to which test is to be run), an indication of a data source (e.g., the dataset with respect to which test is to be run), an indication of fields on the target system (e.g., the fields of the dataset with respect to which test is to be run). According to various embodiments, the payload corresponds to one or more predefined diagnostic tests to be run against the target system (e.g., a dataset, a tenant, and/or environment). In some embodiments, the template corresponds to a predefined diagnostic test that is run against a plurality of datasets. In various embodiments, the plurality of datasets comprises datasets having different sizes, being associated with different tenants, or any other appropriate different data sets.

In some embodiments, for any particular tenant and any particular machine and instance of an environment, a testing machine comprising a cache is provided, and the cache of the testing machine is populated with backend information corresponding to the tenant and/or the environment being tested. As an example, the environment being tested will create the cache that it needs to run this diagnostic program. In some embodiments, in response to receiving a test program, the environment builds the cache in connection with running the test program. The running of the test program causes the payload to be generated. For example, the testing machine runs the test program, and populates the template corresponding to the test in connection with generating the payload. In some embodiments, the payload is generated and used to test performance of execution of the query by a configuration or environment associated with the particular dataset. The population of the template may include replacing one or more placeholders (e.g., variables) comprised in the template with correct values or strings corresponding to one or more field definitions of the dataset to be tested. The one or more field definitions may respectively correspond to an alphanumeric string (e.g., the one or more field definitions may provide an alphanumeric indexing of the corresponding dataset).

In some embodiments, generating the payload (e.g., in connection with implementing a test) comprises obtaining credentials for the tenant or dataset to be accessed, analyzing the datasets to be tested, loading the field definitions for the datasets into cache (e.g., obtaining the field definitions from the backend and storing the field definitions in cache), determining the fields to be tested for a particular test (e.g., the fields used in the template), and obtaining from cache the field definitions for the fields to be tested, and populating the template with the obtained field definitions.

According to various embodiments, a mapper library is used in connection with managing and/or storing a set of field definitions for a dataset. The mapper library may map the field definitions in a manner that the template is populated in a proper order in connection with generating the payload. In some embodiments, the mapper library processes a list of field definitions (e.g., one-by-one) and obtains the correct information for each field. For example, the mapper library may read the field definitions from the back end (e.g., the database layer such as the dataset to be tested) in an order that is the same as the order in which the field definitions are to be populated in the template. As another example, the mapper library may read the field definitions from the cache in an order that is the same as the order in which the field definitions are to be populated in the template.

The system improves the performance testing and load generation by enabling more efficient load generation on different databases (e.g., datasets having different field definitions) and/or different environment (e.g., environments having different architectures or computing resources). The system reduces the amount of manual configuration of a test payload (also referred to herein as the payload) for the corresponding query that needs to be executed. The system also improves the focus of performance testing for monitoring performance of a load by a database and/or an environment by eliminating calls to the database layer to obtain field definitions for the dataset (e.g., the dataset against which a query is to be executed). For example, the system obtains the field definitions for one or more datasets against which the test is to be executed before deployment of the payload to the database layer or environment. The field definitions for the one or more datasets may be stored in cache and obtained (e.g., retrieved from the cache) during generation of the payload. For example, the field definitions for the one or more datasets are pre-fetched and stored in cache. Accordingly, monitoring of the performance of the test corresponding to the payload does not include measurements associated with obtaining the applicable field definitions for the dataset against which the query is to be executed. Accordingly, the system can use the performance testing to accurately measure the throughput of queries/loads, response rates, bottlenecks in the system, etc. The focused performance testing can thus improve the analysis of scalability of a database, a tenant, and/or an environment before deployment.

FIG. 1 is a block a diagram of a network system according to various embodiments of the present application.

In the example illustrated in FIG. 1, system 100 includes database layer 105, business application layer 110, a security layer 115, performance analysis layer 120, and an administrator system 130. In some embodiments, one or more of database layer 105, business application layer 110, security layer 115, and performance analysis layer 120 may be integrated (e.g., combined into a layer or single set of server(s)). For example, the business application layer 110 may include performance analysis layer 120. System 100 further includes one or more networks such as network 125 over which administrator system 130 communicates with one or more of database layer 105, business application layer 110, security layer 115, and/or performance analysis layer 120. In various embodiments, network 125 includes one or more of a wired network, and/or a wireless network such as a cellular network, a wireless local area network (WLAN), or any other appropriate network. In some embodiments, database layer 105, business application layer 110, security layer 115, and performance analysis layer 120 are respectively implemented by one or more servers. As an example, database layer 105 may be implemented as one or more sets of servers. System 100 may include various other systems or terminals.

Administrator system 130 comprises a device for use by an administrator. For example, administrator system 130 comprises a system for communication, data access, computation, etc. An administrator uses administrator system 130 to maintain database layer 105. For example, an administrator uses administrator system 130 to start and/or stop services on database layer 105, to reboot database layer 105, to install software on database layer 105, to add, modify, and/or remove data on database layer 105, etc. Administrator system 130 communicates with database layer 105 via a web-interface. For example, administrator system 130 communicates with database layer 105 via a web-browser installed on administrator system 130. As an example, administrator system 130 communicates with database layer 105 via an application running on administrator system 130. As another example, administrator system 130 communicates with database layer 105, business application layer 110, security layer 115, and/or performance analysis layer 120 via an application running on administrator system 130. An administrator user uses administrator system 130 to configure and/or access data stored in database layer 105, such as to query or configure a dataset for an associated tenant (e.g., tenant 1, tenant 2, etc.). An administrator user uses administrator system 130 to configure a security setting or policy, and/or enable/disable a security setting or policy for a service (e.g., one or more tenants in the database layer 105, an environment, etc.). As an example, administrator user uses administrator system 130 to define or set the particular authentication system or process to authenticate users accessing a dataset (e.g., associated with a tenant). An administrator user uses administrator system 130 to define (e.g., configure) a test and/or a test plan (e.g., a plan comprising one or more tests) such as via performance analysis layer 120. As an example, the administrator user uses administrator system 130 to create or modify a test that is stored on performance analysis layer 120, to instruct the performance analysis layer 120 to deploy the test or test plan (e.g., to communicate a test program(s) and/or template(s) to environments to run the test), and/or to obtain/view a result of the test or test plan (e.g., a report of one or more performance characteristics of the test, a report of an element or configuration the impedes performance of a target system, a report of a performance of various elements or configurations in the target system, a report of an analysis of the test such as a benchmarking of results of the test across different environments, tenants, datasets, etc.).

In various embodiments, an administrator (or other user associated with a tenant or entity with which the tenant is associated such as a customer) uses administrator system 130 to configure a service provided to a tenant. As an example, the administrator uses administrator system 130 to communicate with business application layer 110 to configure the service provided to the tenant. In some embodiments, business application layer 110 serves as a gateway via which the administrator may interface to manage, configure, etc. database layer 105, security layer 115, and/or performance analysis layer 120.

The database layer 105 stores one or more datasets. In various embodiments, the one or more datasets comprise human resources data, financial data, organizational planning data, or any other appropriate data. In some embodiments, the database layer 105 stores one or more datasets for a plurality of tenants. For example, the database layer 105 hosts at least part of a software as a service (e.g., a database storing data for the service) for a plurality of tenants such as customers for a provider of the software as a service). As illustrated in FIG. 1, database layer 105 comprises a plurality of tenants (e.g., tenant 1 and tenant 2). As an example, database layer 105 comprises a database system for storing data in a table-based data structure, an object-based data structure, etc. In various embodiments, database layer 105 comprises a business database system, a human resources database system, a financial database system, a university database system, a medical database system, a manufacturing database system, or any other appropriate system. According to various embodiments, one or more tests are performed with respect to a dataset, tenant, and/or environment of database layer 105. As an example, a test corresponds to a query or other request to be processed by database layer 105. Database layer 105 performs at least part of the tests (e.g., processes a query, etc.), and provides a response to business application layer 110 and/or performance analysis layer 120. In some embodiments, database layer 105 receives at least part of payload in connection with performing the test. As an example, the payload comprises configurations (e.g., settings, parameters, etc.) of a query to be run against the particular dataset. In some embodiments, in response to obtaining the query, database layer 105 executes the query with respect to the applicable query. As an example, database layer 105 generates the query using at least part of a payload corresponding to a test (e.g., database layer 105 populates the template and obtains the query based on the populated template). As another example, database layer 105 receives the query from another layer, such as the business application layer 110 (e.g., business application layer 110 generates the query using the payload and/or a test program.

According to various embodiments, a user uses system 100 (e.g., a client or terminal that connects to system 100 via network 125) to execute one or more tests with respect to data (e.g., one or more datasets) stored on database layer 105, an implementation of a tenant, and/or an implementation of an environment. For example, a user inputs to or configures using a client terminal or user system 135 a test, a test plan, and/or a query (e.g., corresponding to a test load that is to be generated and performance of which is to be measured), the business application layer 110 receives the test, test plan, and/or query and provides the query to database layer 105, and database layer 105 receives the query or request to execute the task from client terminal via network 125, etc. In response to receiving the query or request to execute the task, database layer 105 executes the task or query, and provides to business application layer 110 or performance analysis layer 120 information pertaining to the performance of the task or query. In some embodiments, the information pertaining to the performance of the task or query comprises one or more performance characteristics associated with performing the task or query. For example, the one or more performance characteristics are associated with a measure of throughput of queries/loads, response rates, bottlenecks in the system, etc.

According to various embodiments, a user uses system 100 (e.g., using user system 135 or a client or terminal that connects to system 100 via network 125) in connection with analyzing a performance of one or more tests, tests plans, etc. For example, the user connects to the business application layer 110 or performance analysis layer 120 (e.g., such as via the business application layer 110), and obtains information pertaining to the performance of one or more tests, tests plans, etc. As an example, the information pertaining to the performance of one or more tests, tests plans, etc. is provided in a report such as a report that is generated (e.g., specifically for the test or test plan) or via a user interface (e.g., as user interface that provides one or more selectable elements that enables a user to drill down into one or more performance characteristics associated with performance of the test(s) with respect to a dataset, a tenant, an environment, etc.). For example, the user uses the user interface to compare/benchmark performance of a test across various datasets, tenants, and/or environment. As another example, the user uses a user interface to isolate performance of a dataset, a tenant, an environment, and/or a configuration of any of the foregoing.

According to various embodiments, security layer 115 provides security with respect to system 100 such as database layer 105. For example, security layer 115 determines information (or a set of information, etc.) that a particular user or account is permitted to access. In some embodiments, security layer 115 mediates access to the database layer 105 in connection with performance of a test or test plan. For example, the security layer 115 ensures that the test program or layer performing the test has requisite permissions to make certain calls such as a querying of database layer 105, causing the test load to be generated on a dataset, tenant, and/or environment, etc. In some embodiments, security layer 115 provides authentication information to a test program or business application layer 110 in connection with execution of a test or test plan. For example, the security layer 115 provides authentication information to be used in connection with obtaining field definitions for one or more fields of one or more datasets. As an example, the field definitions pertaining to a dataset are cached such as to isolate (and exclude) certain overhead from performance of the test (e.g., to ensure that results or one or more performance characteristics associated with performing the test do not include the retrieval of the field definition(s) from the database layer 105 or certain other overhead, etc.). As another example, the security layer 115 provides authentication information to be used in connection with a test load (e.g., corresponding to a test) being generated at the database layer 105 such as by querying one or more datasets, or causing a tenant or environment to perform a task or function associated with the layer). In some embodiments, security layer 115 mediates access to business application layer 110 and/or performance analysis layer 120 in connection with a user attempting to access reports or analysis of the performance of a test. For example, security layer 115 authenticates a user accessing the reports or analysis of the performance of a test, etc.

According to various embodiments, performance analysis layer 120 stores and/or manages results of performance of a test or test plan. For example, the performance analysis layer 120 performs an analysis (e.g., a statistical analysis, a benchmarking, etc.) of the performance of one or more tests or test plans. The performance analysis layer 120 provides (e.g., to a user) results of a test or an analysis of a test such as via business application layer 110.

In some embodiments, performance analysis layer 120 tracks (e.g., stores) a median response (e.g., response time) over time, and system 100 (e.g., the performance analysis layer 120) determines when the performance deviates from the median (e.g., when the response spikes relative to the median response). In response to determining that a current performance deviates more than a threshold value or threshold percentage from the median, system 100 (e.g., business application layer 110) generates a notification and provides the notification a user (e.g., to an administrator, a developer, etc.). In some embodiments, performance analysis layer 120 identifies (e.g., determines) an association between a change in the target system (e.g., a dataset, tenant, and/or environment being tested) and a change in the performance (e.g., if performance changes in response to, or relatively soon after, an API is updated, a dataset is reconfigured, variability of code, a change in hardware, etc.). As another example, system 100 performs or recommends (e.g., to a user) a remedial action in response to performance analysis layer 120 determining that the performance of the test satisfies one or more thresholds (e.g., if a latency for a particular request is longer than a latency threshold, etc.).

According to various embodiments, performance analysis layer 120 performs an analysis (e.g., a comparison, benchmarking, etc.) of the performance of the test across a plurality of datasets, tenants, and/or environments to which the test(s) was deployed. Different configurations of a target system (e.g., a dataset, a database layer, a tenant, an environment, etc.) can cause or lead to different efficiencies or inefficiencies with respect to data access, processing, and/or network access. Accordingly, the performance analysis layer 120 is used in connection with determining desirable and/or undesirable configurations of a target system.

According to various embodiments, business application layer 110 provides an interface via which a user (e.g., an administrator using administrator system 130 or another user using system 100 via a client terminal or user system 135 connected to network 125) may interact with database layer 105, security layer 115, and/or performance analysis layer 120. For example, a user queries database layer 105 by sending a query/request to business application layer 110, which interfaces with database layer 105 to obtain information responsive to the query (e.g., business application layer 110 formats the query according to the applicable syntax and send the formatted query to database layer 105). As another example, an administrator uses an interface provided/configured by business application layer 110 to upload information, a model, update to information/models to database layer 105, configure a test or test plan, instruct deployment of a test or test plan, to view review results of one or more tests or bench marking. As another example, an administrator uses an interface provided/configured by business application layer 110 to define/update a test plan (e.g., define parameters of a test such as in connection with configuring a test load to be generated), to update security policies, etc.

In some embodiments, database layer 105, business application layer 110, and/or security layer 115, and/or performance analysis layer 120 are implemented on a single server or a plurality of servers. For example, database layer 105 and business application layer 110 are different modules running on a same server or set of servers.

Figure 2:
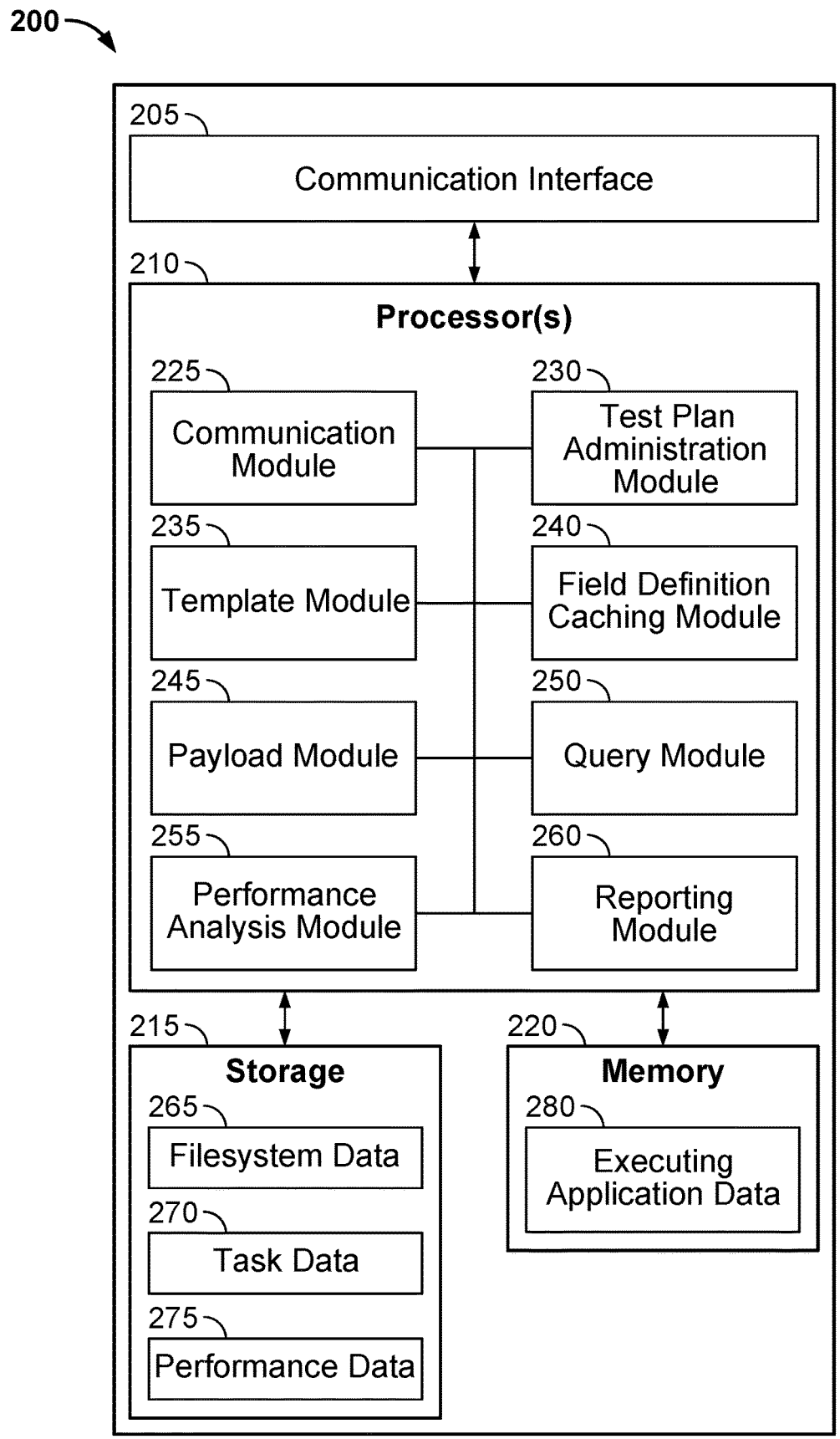
FIG. 2 is a block diagram of a testing system according to various embodiments of the present application.

FIG. 2 is a block diagram of a testing system according to various embodiments of the present application. In some embodiments, system 200 comprises, or corresponds to, performance analysis layer 120, business application layer 110, and/or database layer 105. System 200 may implement at least part of system 100 of FIG. 1, association 300 of FIG. 3, payload 400 FIG. 4, process 500 of FIG. 5, process 600 of FIG. 6, and/or process 700 of FIG. 7. According to various embodiments, system 200 corresponds to, or comprises, a system for deploying a test program, executing a test or test plan (e.g., causing a test load to be generated at a target system), and/or analyzing results of a test or test plan.

In the example shown, system 200 implements one or more modules in connection with managing one or more datasets, managing encryption/decryption of data (e.g., a dataset) such as data in a tenant database, managing configuration of a test or test plan, managing caching of field definitions of one or more datasets with respect to which a test is to be deployed, managing deployment of the test or test plan, managing monitoring of execution of the test or test plan (e.g., obtaining one or more performance characteristics associated with executing a test), managing analysis of results of the test or test plan (e.g., aggregating, comparing, and/or benchmarking results associated with one or more target systems and/or one or more tests such as different tests deployed to a same target system), and managing reporting the analysis of the results of the test or test plan (e.g., providing a report or user interface comprising information pertaining to the results). System 200 comprises communication interface 205, one or more processors 210, storage 215, and/or memory 220. One or more processors 210 comprises one or more of communication module 225, test plan administration module 230, template module 235, field definition caching module 240, payload module 245, query module 250, performance analysis module 255, and/or reporting module 260.

In some embodiments, system 200 comprises communication module 225. System 200 uses communication module 225 to communicate with various client terminals or user systems such as a user system or an administrator system, or other layers of system 100 such as a third-party management service layer, a tenant database, etc. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems (e.g., from the terminals or systems via a business application layer). The one or more queries or requests to execute tasks is/are with respect to information stored in one or more datasets. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more users interfaces (e.g., an interface that user system is caused to display).

In some embodiments, communication module 225 is configured to receive information and/or an instruction pertaining to a test or test plan (e.g., a configuration of a test, a definition of a test load, an identification of a target system, an instruction to execute a test, etc.) such as from various client terminals or user systems. For example, a user uses a client terminal to configure a test or test plan on system 200. Examples of configurations with respect to a test or test plan include a definition of a template corresponding to a test (e.g., the template is dataset, tenant, and/or environment agnostic), an identification of a target system that is to be tested (e.g., a dataset, tenant, and/or environment for which a test load is to be generated and a response to such test load is to be measured), a set of tests to be run against one or more target systems as a test plan, an indication of one or more performance characteristics to be monitored/measured (e.g., a throughput, a response rate, etc.), etc. In some embodiments, communication module 225 is configured to communicate results of the test or test plan. For example, communication module 225 sends the results to a user such as via a user interface of a client terminal. Examples of the results of the test or test plan include a report of one or more performance characteristics, a benchmarking across a set of tests, an analysis of the one or more performance characteristics, an mean or median response rate, a statistical outlier relative to past tests or relative to results from different target systems, an identification of a configuration or component causing a degradation or bottleneck in processing the test load, etc.

In some embodiments, system 200 comprises test plan administration module 230. According to various embodiments, test plan administration module 230 is implemented in database layer 105, business application layer 110, and/or performance analysis layer 120. System 200 uses test plan administration module 230 to configure and store a test or test plan. As an example, test plan administration module 230 configures and/or provides a user interface via which a user configures a test or a test plan. The user uses test plan administration module 230 to set (e.g., input, upload, etc.) a definition of at least part of a test such as a template for generating a test load, a setting of one or more target systems that are to be tested (e.g., for which performance of executing the test load is to be measured), a definition of one or more performance characteristics to be monitored during execution of the test, a schedule or frequency for which the test is to be executed, etc. In some embodiments, test plan administration module 230 manages deployment of the test to the target systems, etc. For example, a user uses test plan administration module 230 to instruct system 200 to execute the test, and in response to receiving an instruction to execute the test, test plan administration module 230 initiates the deployment of the test (or test program associated with the tests) and receives results from the execution of the test (e.g., the one or more performance characteristics obtained via execution of the test).

According to various embodiments, system 200 comprises template module 235. System uses template module 235 to store one or more templates corresponding to one or more tests. In some embodiments, a template is pre-configured to correspond to a test load such that use of the template to generate a payload will cause the test load to be generated at the corresponding target system. In some embodiments, the template is pre-configured to be agnostic with respect to the target system (e.g., tenant and/or environment) on which the corresponding test is to be implemented. The template is used in connection with generating a payload that is to implement to test the corresponding target system. According to various embodiments, the template comprises one or more placeholder values for fields used in connection with generating the test load (e.g., fields that are used a parameter of a query to be executed by a database layer, etc.). As an example, one or more placeholder values are replaced with values (e.g., a number, an alphanumeric string, etc.) of corresponding fields of the dataset against which the test is to be run. As another example, one or more placeholder values are replaced with a particular setting or configuration of a target system to be tested (e.g., a particular configuration of computing resources of an environment is used to replace a corresponding placeholder value, an authentication credential is inserted, etc.). In some embodiments, replacement of one or more placeholder values transforms the template from a template that is agnostic to the target system for which the test is to be deployed to a template that is specific to a configuration of the target system.

According to various embodiments, system 200 comprises field definition caching module 240. System 200 uses field definition caching module 240 to obtain (e.g., retrieve) field definitions (e.g., values such as alphanumeric strings) corresponding to fields of a dataset. The field definition(s) corresponding to fields of the dataset are stored in a cache (e.g., a cache of memory 220) upon (e.g., in response to) retrieval from the backend storage such as the database layer. In some embodiments, field definition caching module 240 performs a lookup with respect to one or more datasets to obtain at least one field definition for a field of the one or more datasets (e.g., a dataset associated with a specific tenant). As an example, field definition caching module 240 obtains a field definition for each field in a dataset. Generally, datasets comprise hundreds or thousands of fields and various tests may be configured to use different fields of a dataset (e.g., to target different configurations or elements of a target system being tested). Accordingly, obtaining a field definition for each field in a dataset reduces the overhead associated with making calls to the backend storage (e.g., the database layer) for the field definitions. In some embodiments, field definition caching module 240 determines one or more datasets that are to be tested (or for which the corresponding tenant or environment is to be tested). For example, field definition caching module 240 determines the one or more datasets that are to be tested based at least in part on a test or a test plan that comprises parameters for a series of tests to be executed. Field definition caching module 240 obtains (e.g., retrieves) a field definition for at least one field of the one or more datasets determined to be tested. For example, in response to determining the one or more datasets that are to be tested, field definition caching module 240 requests the field definitions for such one or more datasets. In some embodiments, field definition caching module 240 obtains an authentication credential(s) associated with accessing the one or more datasets (e.g., the dataset for which a field definition is to be retrieved), and communicates the authentication credential(s) in connection with obtaining the field definition(s) for the dataset(s). As an example, system 200 logs into a tenant associated with the dataset before field definition caching module 240 requests and/or obtains the field definition(s) from the database layer for the dataset. According to various embodiments, field definition caching module 240 obtains the field definition(s) for a dataset before a test is executed with respect to the dataset. For example, in connection with isolating the retrieval of field definitions for the dataset from execution of the test, the field definitions are retrieved and stored in cache before execution of the test. Accordingly, execution of the test includes using the field definitions stored in cache, which is generally significantly faster than retrieving the field definitions via making calls to the backend storage contemporaneous with performing a query.

According to various embodiments, system 200 comprises payload module 245. System 200 uses payload module 245 to generate a payload to be used in connection with deployment of a test to a target system. In some embodiments, payload module 245 transforms a template from a template that is agnostic to a target system being tested (e.g., agnostic with respect to dataset, tenant, or environment) to a payload to be used in connection with deploying the test to a particular target system such as target system identified in a test plan. As an example, generating the payload comprises replacing placeholder values of a template with the appropriate field definitions corresponding to the dataset to be tested. As an example, replacing the placeholder values of a template comprises setting a pointer to a location in a cache at which the applicable field definition is stored. In some embodiments, the payload comprises a mapping of fields to field definitions of the dataset to be tested (e.g., a dataset that is to form the basis of a test load generated in connection with execution of a test). For example, the payload comprises the field definitions for the fields in a manner that the field definitions are ordered according to a definition of the test (e.g., if the test corresponds to a query against a dataset, the field definitions are ordered and mapped to the applicable placeholders of the template for generation of the query for the dataset to be queried). According to various embodiments, the payload comprises one or more of (i) an authentication credential, (ii) an indication of a dataset, and (iii) an indication of fields of the dataset. As an example, the authentication credential is used to access the dataset (e.g., to login to the corresponding tenant or environment, or to decrypt data comprised in the dataset). As an example, the indication of the dataset is used to identify the dataset to be tested. As an example, the indication of the fields of the data is used to define the fields that are to be used in connection with execution of the test (e.g., the field(s) to be used in generating the test load for the test). In some embodiments, the payload comprises one or more configurations of a particular environment associated with a test (e.g., an environment in which the dataset and/or tenant to be tested is deployed). In various embodiments, the payload is in a JavaScript Object Notation (JSON) format or is in any other appropriate format.

In some embodiments, in response to generating the payload, payload module 245 provides the payload to the test program. In response to receiving the payload, the test program deploys the test. For example, the test program identifies the dataset to be tested and thus the program configures a call to a database layer with respect to the dataset. The call to the database layer is further configured based on the field definitions comprised in the payload for the fields of the dataset. The call to the database further comprises the applicable authentication credential (if any) to perform calls (e.g., queries, computations, etc.) with respect to data in the dataset. In some embodiments, the test program further configures the call to the database based at least in part on the test plan, such as determining the particular query to be used to generate the test load.

According to various embodiments, system 200 comprises query module 250. System 200 uses query module 250 to perform a query with respect to the database layer. For example, in response to payload module 245 generating the payload, query module 250 determines the dataset to query (e.g., using an identifier of the dataset comprised in the payload), configures a query (e.g., the query corresponding to the test such as to cause the test load to be generated), and sends the query to the database layer in connection with querying the dataset (e.g., the data to be tested or a dataset associated with a tenant or environment to be tested). In some embodiments, query module 250 configures the query based at least in part on the payload and/or a corresponding test plan.

According to various embodiments, system 200 comprises performance analysis module 255. System 200 uses performance analysis module 255 to monitor performance of one or more tests and to analyze the performance of the one or more tests. For example, performance analysis module 255 monitors one or more performance characteristics associated with the performing the test (e.g., a query, a computation, or otherwise processing a test load that is generated via deployment of the test). In some embodiments, performance analysis module 255 analyzes results of one or more tests to isolate configurations that are impeding scalability (e.g., identify a particular configuration of the dataset, database, tenant, and/or environment that causes a processing time to be relatively long such as compared to other configurations). In some embodiments, performance analysis module 255 analyzes results of one or more tests to determine whether performance with respect to an implementation (e.g., an implementation of a dataset, database, tenant, and/or environment) degrades such as over time, as code is added to the corresponding target system, and/or as the implementation is scaled (e.g., scaled with respect to a number of queries processed, a number of entries in the database, a size of the database, etc.). As an example, performance analysis module 255 monitors and obtains a performance characteristic as the system is processing the test load (e.g., as the query is being executed). As another example, performance analysis module monitors and obtains a performance characteristic after the system has processed the test load (e.g., after execution of the query is completed). In some embodiments, performance analysis module 255 provides to a user or to system 200 results of one or more tests or an analysis of one or more test. For example, performance analysis module 255 exposes (e.g., sends or permits retrieval of) results and/or analysis to a user such as via reporting module 260.

According to various embodiments, system 200 comprises reporting module 260. System 200 uses reporting module 260 to provide results and/or analysis of one or more tests to a user. As an example, reporting module 260 sends a report of the results and/or analysis to a client terminal. For example, the report is generated according to a predefined report template. As another example, reporting module 260 configures a user interface comprising the results and/or analysis. The user interface comprises one or more selectable elements that, in response to selection, cause the user interface to drill down on a result or analysis of one or more tests for a particular component or configuration of a target system.

According to various embodiments, storage 215 comprises one or more of filesystem data 265, task data 270, and/or performance data 275. Storage 215 comprises a shared storage (e.g., a network storage system) and/or database data, and/or user activity data. In some embodiments, filesystem data 265 comprises a database such as one or more datasets (e.g., one or more datasets for one or more tenants, etc.). Filesystem data 265 comprises data such as a dataset for training a machine learning process, historical information pertaining user activity, a human resources database, a financial database, etc.). In some embodiments, task data 270 comprises information pertaining to one or more tests run by system 200 or by an application running in system 100. For example, task data 270 comprises information pertaining to a query being executed in connection with performance of a test. In some embodiments, performance data 275 comprises information pertaining to a result or analysis of one or more tests. As an example, performance data 275 comprises one or more performance characteristics, a report, a benchmarking of tests across target systems or a benchmarking of a plurality of tests performed against a particular target system, etc.

According to various embodiments, memory 220 comprises executing application data 280. In some embodiments, executing application data 280 comprises one or more field definitions corresponding to one or more datasets. For example, executing application data 280 comprises one or more field definitions cached by field definition caching module 240. In some embodiments, executing application data 280 comprises data obtained or used in connection with executing an application such as an application executing on a tenant. In embodiments, the application comprises one or more applications that perform one or more of receive and/or execute a test, a query or task, etc., generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
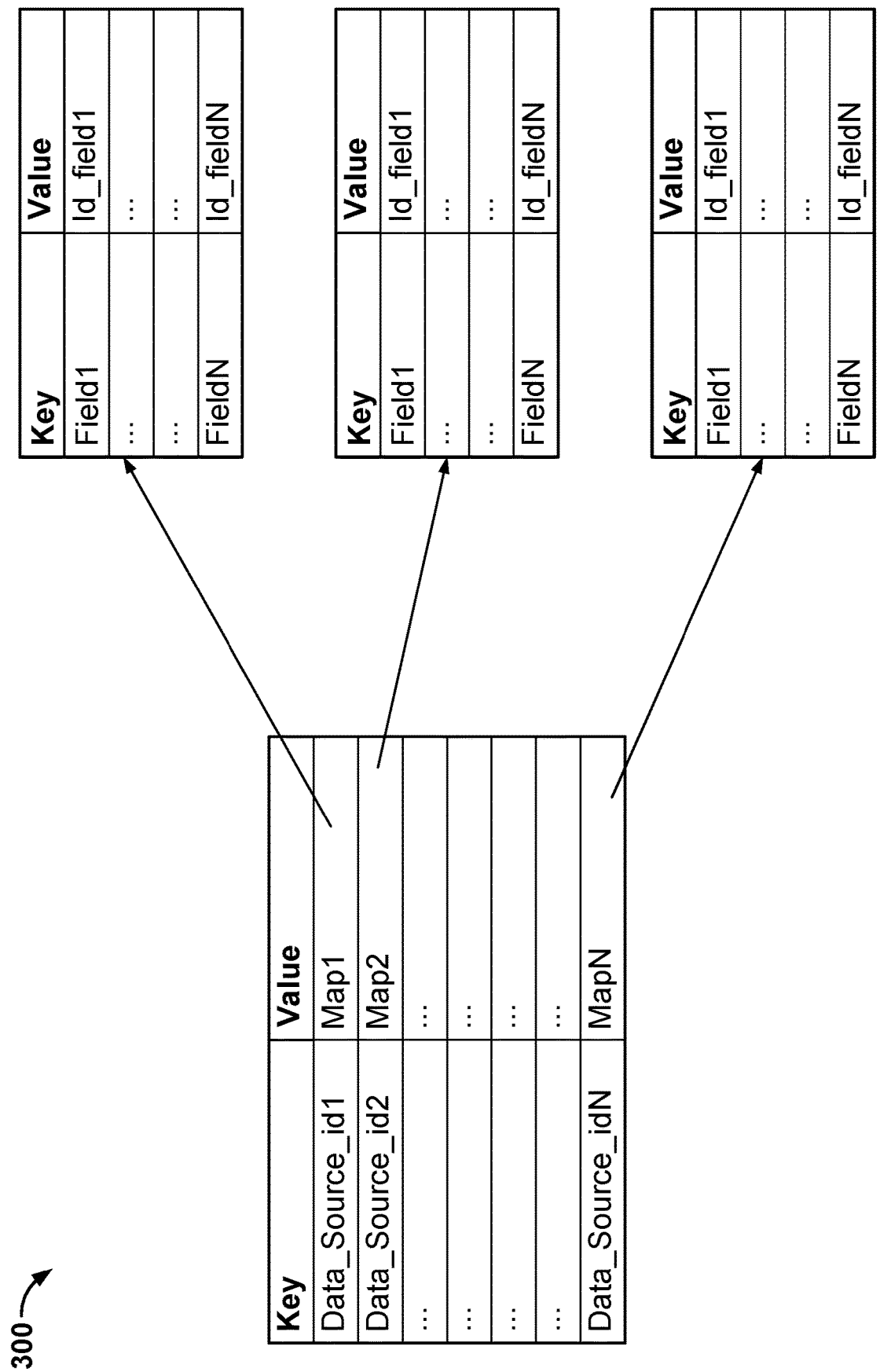
FIG. 3 is a diagram of an example of an association of field definitions for datasets according to various embodiments of the present application.

FIG. 3 is a diagram of an example of an association of field definitions for datasets according to various embodiments of the present application. In the example shown, association 300 comprises a mapping of data sources (e.g., datasets) to associations of field definitions for fields for the data sources. For example, a mapping of field definitions (e.g., alphanumeric strings, values, etc.) to fields is stored for each dataset. In some embodiments, association 300 indicates key value pair data_source_1 and map1, which points to key value mapping of key of field1 to value of id_field1 . . . to key of fieldN to value of id_fieldN; association 300 indicates key value pair data_source_2 and map2, which points to key value mapping of key of field1 to value of id_field1 . . . to key of fieldN to value of id_fieldN; and association 300 indicates key value pair data_source_N and mapN, which points to key value mapping of key of field1 to value of id_field1 . . . to key of fieldN to value of id_fieldN. According to various embodiments, association 300 is stored in a cache of the system (e.g., the test system). For example, the system retrieves the various field definitions for each dataset and stores the field definitions in association 300. The association 300 is generated (or updated) before execution of a query or other task (e.g., computation, etc.) corresponding to a test. For example, the retrieval of the field definitions and storing of such in cache before deploying a query for a test ensures that the call to the backend storage (e.g., the database layer) for the field definitions is isolated and excluded from the measurement of performance of query by the target system. In some embodiments, the data sources are associated with different tenants.

In some embodiments, the system for environment agnostic load generation includes a process that is triggered on deployment automatically or manually. The process performs the following: 1) authenticates with a tenant system, 2) fetches a data source identifier, 3) fetch field identifiers (e.g., field identifiers (ids), 4) populate data structure that stores field identifiers (e.g., field ids), 5) parse the payloads, 6) provide query with payload, 7) create and execute test scenarios, and 8) analyze performance based on tests. For example, for authentication with the tenant system a login to the system is performed to retrieve any needed authentication tokens so that the queries that are run can be authenticated. This step simulates user behavior using backend calls so that appropriate tokens are passed along with the workload so that API calls give the expected response and the query can get executed. In some embodiments, there may be a number of different sets of tests (e.g., csv/tsv feeder config files) stored in a library. Each of the sets of tests may be configured to test one or more use cases, scenarios, etc. The set of tests may be in the form of a file (e.g., a feeder config file) containing entries. Each entry may include a pairing of a query (e.g., a json "payload" file) to be run and a datasource against which the query should run. These test sets (e.g., config files) may be passed to the application driving the testing process where the application may execute the queries. In some cases, the queries may be executed sequentially as they appear in the config file. In other cases, the queries may be executed in different orders and/or in parallel. In some embodiments, for fetching the data source identifier, the data source identifier (e.g., data_source_ID, which is the identifier of the data source against which the query is run) is fetched for each entry in the config file containing a query and a datasource. For fetching the field identifiers (e.g., field ids), all the field ids are fetched based on the data_source_ID. For populating the data structure, the ids are stored corresponding to a field of the data set. For example, the real payload is created from a template payload. The field definitions and measure definitions section of a json payload defines the fields that are required for query processing. The values for these fields are fetched from the system based on the field names corresponding to the data_source_ID. In some embodiments, to support other calls for the same data source, the field ids corresponding to the data source are cached in a map. The ids correspond to fields required for query processing, and for each tenant, the dataset is represented in the file system in a manner that requires the ids for access to the information.

As used herein, "field_Definitions" may refer to a part of the payload (or template from which the payload is generated) in which field definitions are set is shown in FIG. 4 as a sub-routine or section of the JSON payload. As used herein, "measure_Definitions" may refer to a part of the payload (or template from which the payload is generated) in which measurements to be computed are indicated (and the appropriate field identifiers may be referenced in such part). As used herein, a "LinkedHashMap" refers to is Hashtable and Linked list implementation of the Map interface, with predictable iteration order. The LinkedHashMap can be used to maintain insertion order, on which keys are inserted into Map or it can also be used to maintain an access order, on which keys are accessed.

In some embodiments, for parsing the payloads, the field_Definitions and measure_Definitions sections of the JSON payload are parsed and the real values for the fields are stored that need to be replaced. In some embodiments, a LinkedHashMap is used to represent the json payload using an object mapper. The fields are parsed in order so that the fields are stored in a list and the ids fetched corresponding to the parsed fields in the same order. In some embodiments, for providing the query to the query processing endpoint with the payload, the query is fired with the correct payload including header information that has tenant and environment specific properties replaced. In some embodiments, for creating and executing test scenarios, the tests are grouped (e.g., those tests needed to be run against master, branch, or projects like multi-tenancy, data discovery, and/or advanced or matrix reports) and run with the appropriate system. The performance metrics (e.g., latency, throughput, and error rate, etc.) are received. For analyzing the performance, the results of the tests including the performance metrics are analyzed to measure the performance including determining whether the test results fall within a minimum, a maximum, above or below a mean, within a standard deviation, etc.

FIG. 4 is a diagram of an example of a payload according to various embodiments of the present application. In the example shown, payload 400 is in a JSON format. According to various embodiments, payload 400 comprises parameters or values that have been populated to configure the payload for the particular dataset, tenant, and/or environment to which the test is to be deployed. As an example, of a template from which payload 400 is generated comprises the placeholder value ${id0}, and in payload 400 such placeholder is replaced with a value corresponding to the dataset to which the test is to be deployed (e.g., data source having an identifier "a07a5944a414018584a00023150006401"). As another example, placeholder ${id1} of the template is populated in payload 400 with a field definition for the field "Organization" (e.g., the field definition value "a07a5944a41401c77076e12016005902" is used to replace the placeholder ${id1}). As another example, placeholder ${id2} of the template is populated in payload 400 with a field definition for the field "Record Date" (e.g., the field definition value "a07a5944a41401c77076e12016007003" is used to replace the placeholder ${id2}). As shown, payload 400 comprises "measure definitions" that are to be computed in connection with execution of the test (e.g., an average of an annual base pay is to be computed, a minimum of an annual base pay is to be computed, and a sum of the annual base pay is to be computed).

Figure 5:
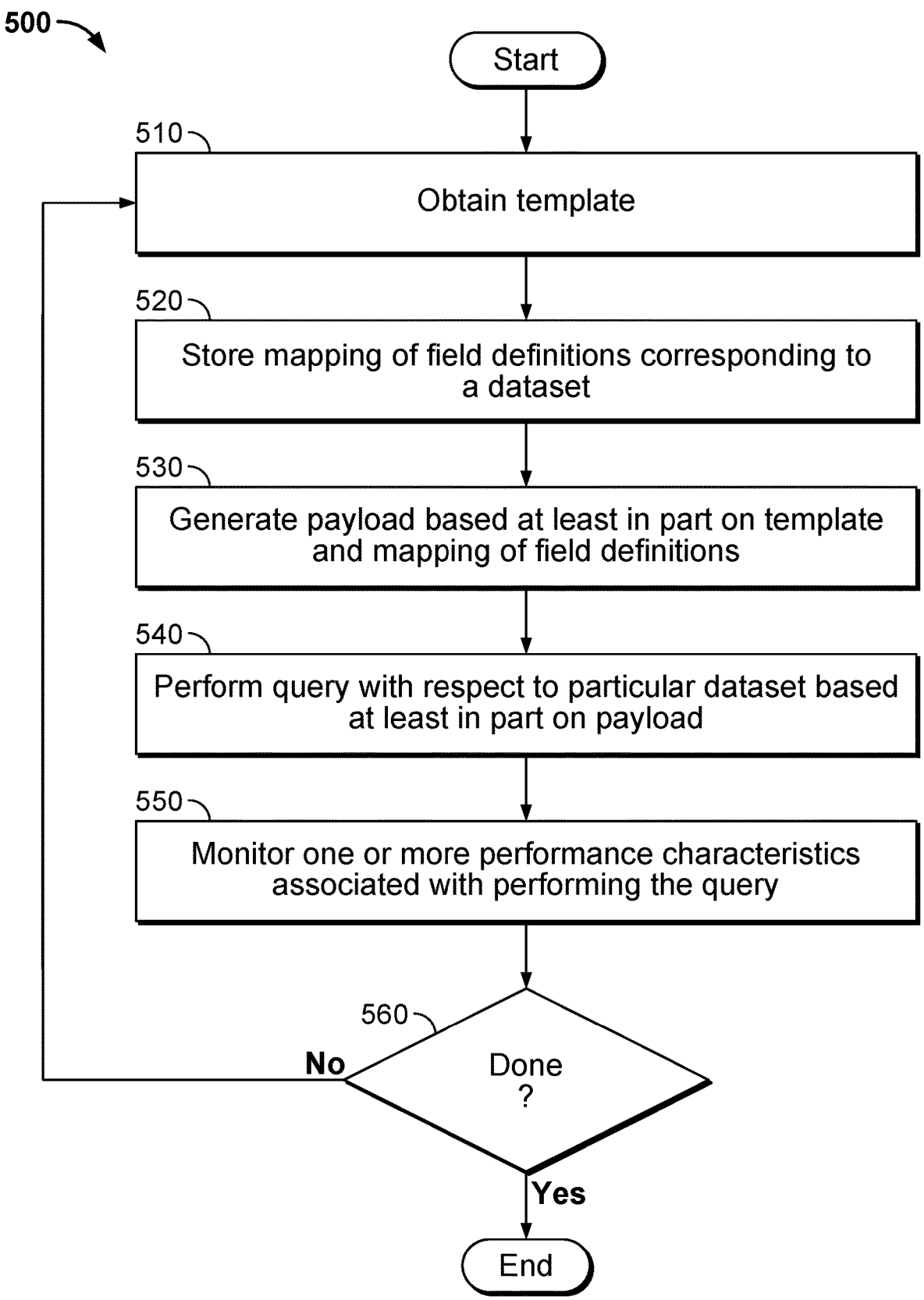
FIG. 5 is a flow diagram of a method for performing a test against a dataset according to various embodiments of the present application.

FIG. 5 is a flow diagram of a method for performing a test against a dataset according to various embodiments of the present application. In some embodiments, process 500 is implemented by system 100 of FIG. 1 and/or system 200 of FIG. 2. Process 500 is implemented in connection executing a test. In some embodiments, process 500 is performed by one or more servers.

At 510, a template is obtained. In some embodiments, the system obtains the template in connection with an instruction to perform a test. For example, in response to receiving an indication that a test is to be performed (e.g., via a user instruction to perform the test, an indication that a test is to be performed based on a preset schedule, etc.), the system determines the template to use in connection with configuring or executing the test. The template is pre-stored and configured for a particular test.

According to various embodiments, the template is pre-configured to correspond to a test load such that use of the template to generate a payload will cause the test load to be generated at the corresponding target system. In some embodiments, the template is pre-configured to be agnostic with respect to the tenant and/or environment on which the corresponding test is to be implemented. The template is used in connection with generating a payload that is to implement to test the corresponding target system. For example, the template is populated based at least in part on one or more configurations associated with the target system (e.g., one or more field definitions of a dataset of the target system, a configuration of the environment of the target system, credential information to access the dataset of the target system, etc.).

At 520, a mapping of field definitions corresponding to a dataset is stored. In some embodiments, the system obtains one or more field definitions for one or more datasets and stores a mapping of the one or more field definitions for one or more datasets in a cache. Storing the field definitions associated with a dataset in cache allows the system to quickly retrieve the field definitions (e.g., in nearly real time) in connection with generating and executing a query such as during execution of a test of a target system. For example, the retrieval of a field definition from cache is significantly lower latency as compared to retrieval of the field definition from a backend storage which would require a call to the backend storage (e.g., the database layer). Retrieving the field definition from the backend storage generally causes delays and bottlenecks in the system which would thus impede measurement of performance specifically directed to the configuration of the dataset, tenant, or environment (e.g., overhead associated with preparing the test such as the query is isolated and excluded from the test being measured).

In some embodiments, the system obtains the field definitions corresponding to a dataset and stores the field definitions in the cache in response to the system receiving an indication that a test is to be performed. For example, in response to receiving an instruction to execute a test, the system determines whether the field definitions or other configurations for the target system are stored in cache, and in response to determining that the field definitions are not stored in cache, the system obtains the applicable field definitions (e.g., all field definitions for the target system(s) being tested) or other configurations and storing such field definition or other configurations in the cache. As an example, the system stores the retrieved field definitions in association 300 of FIG. 3.

In some embodiments, the system logs into the target system (e.g., a tenant corresponding to the dataset) to obtain the field definitions for the dataset. For example, the system obtains requisite credentials and uses the credentials to log into the target system in order to retrieve the field definitions.

At 530, a payload is generated. In some embodiments, the system generates the payload based at least in art on the template and the mapping of field definitions. For example, the template comprises placeholder values for configurations of the target system to be tested and/or placeholder values for field definitions of a dataset of the target system. In connection with executing the test, the system determines the template to use and the field definitions to be used in the execution of the test such as by determining the placeholder values in the template that are to be replaced with the field definitions (e.g., an alphanumeric string, etc.).

According to various embodiments, generating the payload comprises retrieving the field definitions for the dataset of the target system from cache, and inserting the field definitions into the applicable placeholders of the template (e.g., by replacing the placeholder values in the template with the applicable field definitions). As an example, for each placeholder in the template, the system determines the corresponding field definition to be retrieved from cache, and uses such field definition to replace the placeholder value in the template. In some embodiments, the payload is generated using only field definitions that were pre-fetched and stored in cache. In some embodiments, execution of the corresponding test using the payload does not include (or require) a call to the backend storage for a field definition of the dataset for the target system. For example, the payload comprises sufficient information for the system to request the database layer to perform a query.

At 540, a query is performed with respect to a particular dataset based at least in part on the payload. In some embodiments, in response to generating the payload, the system uses the payload in connection with performing a query. For example, a test program deconstructs the payload to determine a dataset to be tested and a query to be generated (e.g., to cause the system to generate the test load using the dataset to be tested). The test program generates the query and sends the query to the database layer. For example, the test program sends to the database layer an indication of the dataset to be used in executing the query, and one or more parameters of the query. As another example, the test program sends to the database layer an authentication credential (if any) for the test program to be authenticated to perform the requested query (e.g., the database layer uses the security layer to determine that the test program has the requisite permissions to request execution of the query).

At 550, one or more performance characteristics associated with performing the query are monitored. In some embodiments, the system monitors performance of execution of the test (e.g., by the target system). For example, the system monitors the performance of the target system handling the test load corresponding to the test. The system obtains one or more performance characteristics associated with the execution of the test (e.g., the performing the query sent to the database layer).

According to various embodiments, the system provides a result of the test (e.g., the performing the query) to a user. For example, the system provides a report comprising at least one performance characteristic. As another example, the system analyzes the one or more performance characteristics relative to results of another test (e.g., results of the same test run by a different target system, or a different test run by the same target system, or both, etc.). For example, the system determines a benchmarking the target system across configurations, components, etc. In some embodiments, the system provides the analysis to a user such as via a user interface.

At 560, a determination is made as to whether process 500 is complete. In some embodiments, process 500 is determined to be complete in response to a determination that the test is complete, no further tests are to be performed (e.g., all tests in a test plan are complete, etc.), the user has exited the system, an administrator indicates that process 500 is to be paused or stopped, etc. In response to a determination that process 500 is complete, process 500 ends. In response to a determination that process 500 is not complete, process 500 returns to 510.

Figure 6:
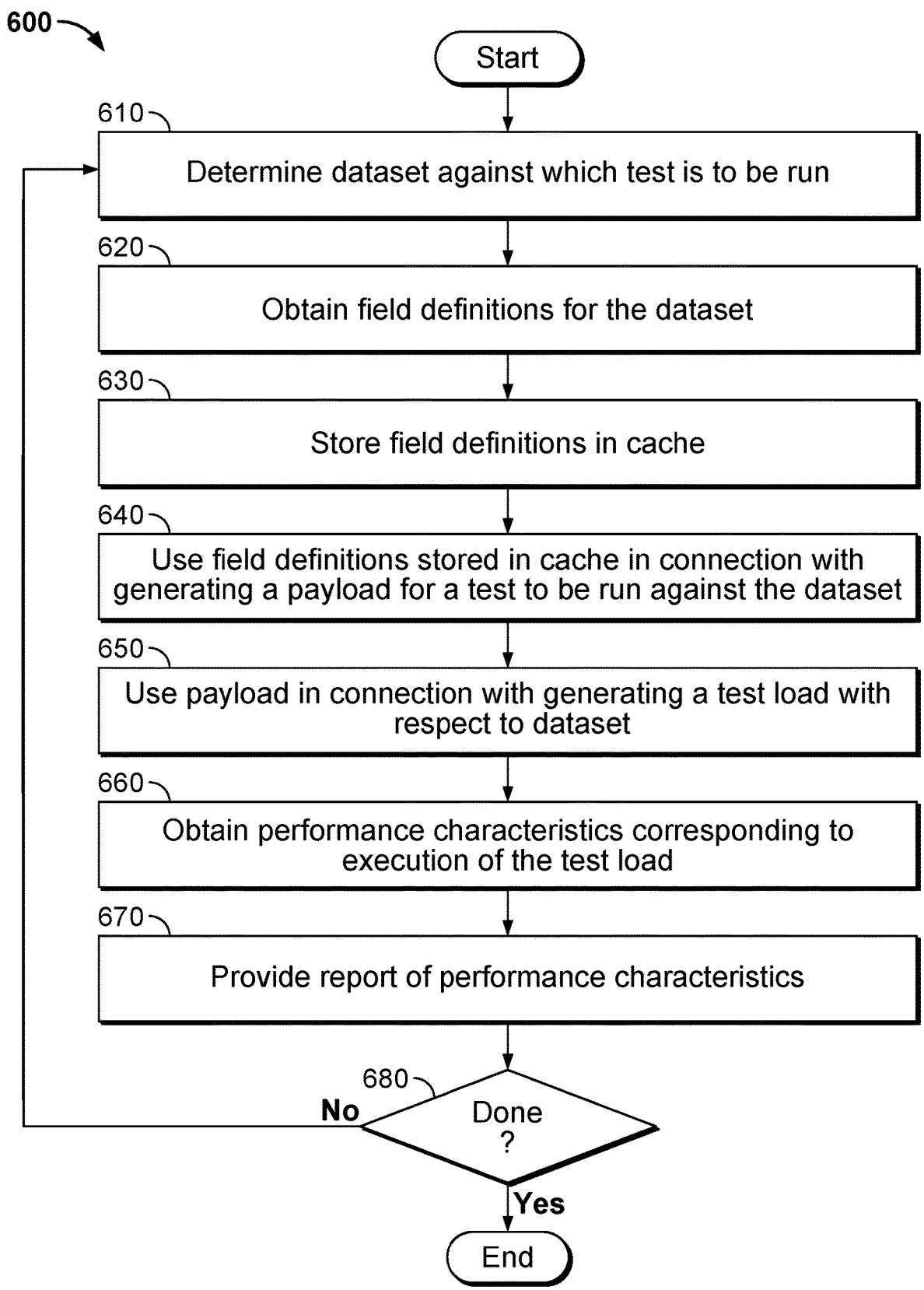
FIG. 6 is a flow diagram of a method for performing a test against a dataset according to various embodiments of the present application.

FIG. 6 is a flow diagram of a method for performing a test against a dataset according to various embodiments of the present application. In some embodiments, process 600 is implemented by system 100 of FIG. 1 and/or system 200 of FIG. 2. Process 600 is implemented in connection executing a test. In some embodiments, process 600 is performed by one or more servers.

At 610, a dataset is determined. In some embodiments, the system determines the dataset against which a test is to be run. According to various embodiments, the dataset is determined based at least in part on a test plan such as a test plan corresponding to the test. For example, the test plan comprises an identifier for the dataset (or a tenant corresponding to the dataset, etc.). According to various embodiments, the dataset is determined based at least in part on a user input such as an instruction to implement a test. For example, the user inputs a selection of a test to run (e.g., a selection from among a plurality of predefined tests) and a dataset against which the test is to be run.

At 620, one or more field definitions for the dataset are obtained. In some embodiments, the system obtains the one or more field definitions from a database layer. For example, in response to determining that a test is to be executed (e.g., based on a user input or a predetermined test schedule) and/or in response to determining the dataset, the system sends a query to the database layer for one or more field definitions for the dataset. The system obtains the one or more field definitions before execution of the test with respect to the dataset.

According to various embodiments, in response to determining that a test is to be executed, the system determines whether the field definitions or other configurations for the target system are stored in cache, and in response to determining that the field definitions are not stored in cache, the system obtaining the applicable field definitions (e.g., all field definitions for the target system(s) being tested) or other configurations.

At 630, the one or more field definitions for the dataset are stored in a cache. According to various embodiments, in response to obtaining the one or more field definitions for the dataset, the system stores the field definitions in the cache.

As an example, the system stores the retrieved field definitions in association 300 of FIG. 3. The system pre-fetches the one or more field definitions and stores the one or more field definitions before invoking generation of the test load (e.g., before sending a call to the database layer such as a query or a request to perform a computation, etc.).

At 640, the field definitions stored in cache are used in connection with generating a payload for a test to be run against the dataset. In some embodiments, the system retrieves at least one field definition from cache and includes the field definition in the payload. For example, the system determines at least one field definition invoked by a test (e.g., to be used in executing the test such as in connection with generating the test load), retrieves the at least one field definition from cache, and includes the at least one field definition in the payload. An example of the payload includes payload 400 of FIG. 4.

According to various embodiments, the payload comprises one or more of (i) an authentication credential, (ii) an indication of a dataset, and (iii) an indication of fields of the dataset. As an example, the authentication credential is used to access the dataset (e.g., to login to the corresponding tenant or environment, or to decrypt data comprised in the dataset). As an example, the indication of the dataset is used to identify the dataset to be tested. As an example, the indication of the fields of the data is used to define the fields that are to be used in connection with execution of the test (e.g., the field(s) to be used in generating the test load for the test). In some embodiments, the payload comprises one or more configurations of a particular environment associated with a test (e.g., an environment in which the dataset and/or tenant to be tested is deployed). In various embodiments, the payload is in a JavaScript Object Notation (JSON) format or any other appropriate format.

At 650, the payload is used in connection with generating a test load with respect to the dataset. In some embodiments, the system uses the payload to cause a test load to be generated. For example, a test program generates a call to a database layer, and the call is generated based at least in part on information comprised in the payload. The test program identifies the dataset to be tested (e.g., for which the test load is to be generated) from the payload, determines the parameters of the test load to be generated comprised the payload, and uses the parameters to causes a database layer to generate the test load with respect to the dataset identified in the payload. In some embodiments, the parameters for the test load include one or more field definitions (e.g., an identifier of fields to be used in connection with generating the test load) and one or more tasks (e.g., queries, computations, etc.) to be performed with respect to data in at least a subset of the fields corresponding to the one or more field definitions. In some embodiments, the test program causes the database layer to generate the test load based at least in part on sending an instruction or query to the database layer.

At 660, one or more performance characteristics corresponding to execution of the test load are obtained. In some embodiments, the system monitors performance of execution of the test load (e.g., by the target system). For example, the system monitors the performance of the target system handling the test load corresponding to the test. The system obtains one or more performance characteristics associated with the execution of the test load (e.g., the performing the query sent to the database layer).

At 670, a report of the one or more performance characteristics is provided. According to various embodiments, the system provides a result of the test (e.g., the performing the query) to a user. For example, the system provides a report comprising at least one performance characteristic. As another example, the system analyzes the one or more performance characteristics relative to results of another test (e.g., results of the same test run by a different target system, or a different test run by the same target system, or both, etc.). For example, the system determines a benchmarking the target system across configurations, components, etc. In some embodiments, the system provides the analysis to a user such as via a user interface.

At 680, a determination is made as to whether process 600 is complete. In some embodiments, process 600 is determined to be complete in response to a determination that the test is complete, no further tests are to be performed (e.g., all tests in a test plan are complete, etc.), the user has exited the system, an administrator indicates that process 600 is to be paused or stopped, etc. In response to a determination that process 600 is complete, process 600 ends. In response to a determination that process 600 is not complete, process 600 returns to 610.

Figure 7:
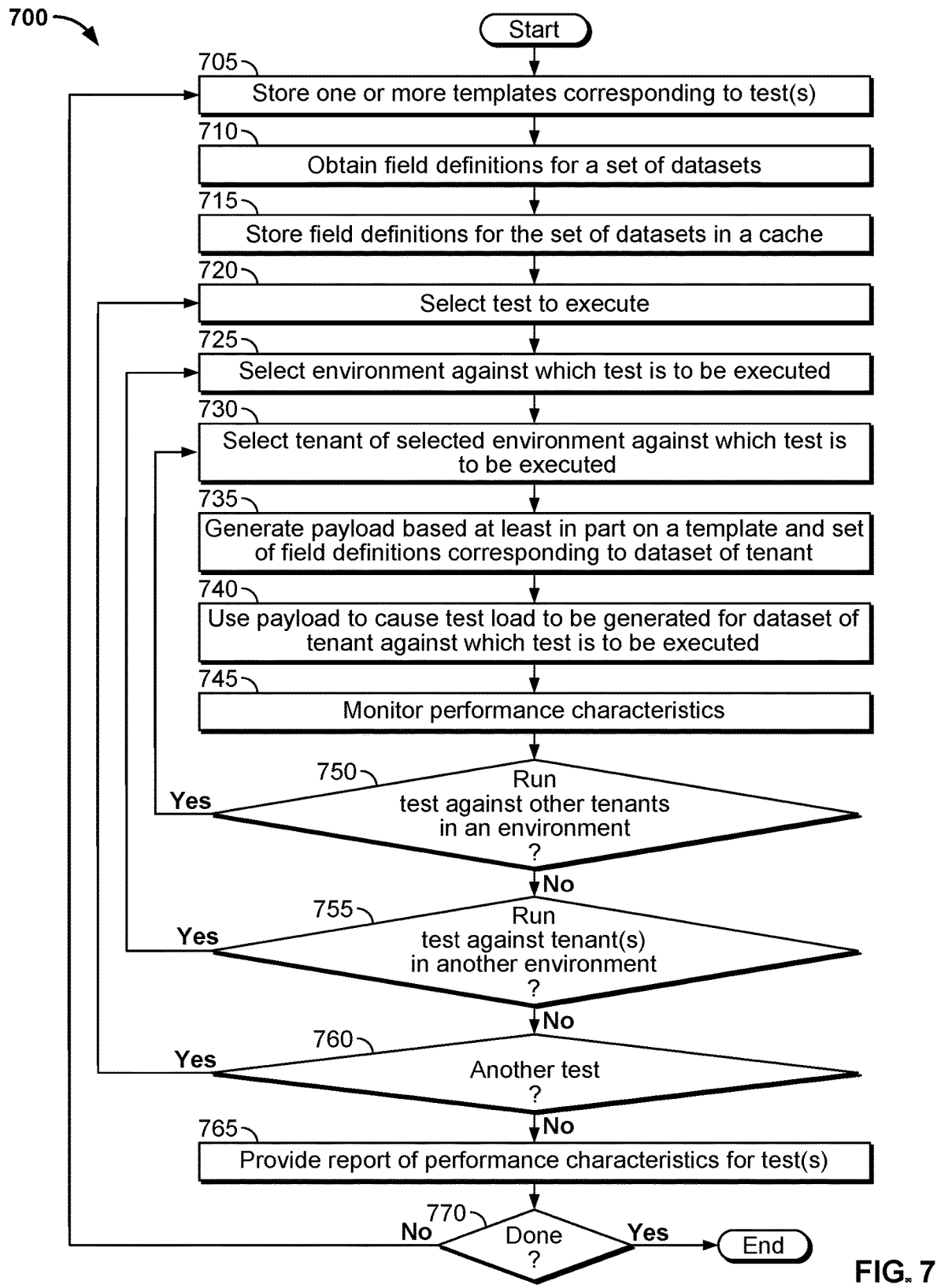
FIG. 7 is a flow diagram of a method for performing one or more tests across multiple tenants and/or multiple environments according to various embodiments of the present application.

FIG. 7 is a flow diagram of a method for performing one or more tests across multiple tenants and/or multiple environments according to various embodiments of the present application. In some embodiments, process 700 is implemented by system 100 of FIG. 1 and/or system 200 of FIG. 2. Process 700 is implemented in connection executing a test. In some embodiments, process 700 is performed by one or more servers.

At 705, one or more templates corresponding to tests are stored. According to various embodiments, a template is pre-configured to correspond to a test load (e.g., use of the template to generate a payload will cause the test load to be generated at the corresponding target system). In some embodiments, the template is pre-configured to be agnostic with respect to the tenant and/or environment on which the corresponding test is to be implemented. The template is used in connection with generating a payload that is to implement testing the corresponding target system. For example, the template is populated based at least in part on one or more configurations associated with the target system (e.g., one or more field definitions of a dataset of the target system, a configuration of the environment of the target system, credential information to access the dataset of the target system, etc.).

In some embodiments, a user or organization stores a set of one or more templates in accordance with defining (and pre-storing) tests. The set of one or more templates may be associated with a test plan, etc. For example, the test plan includes implementation of different tests to cause a target system to generate different test loads in connection with enabling analysis of performance of different components, code, or configurations of the target system(s). As another example, the test plan implementation of a set of tests to be performed against a set of target systems.

At 710, field definitions for a set of datasets are obtained. In some embodiments, the system obtains the one or more field definitions for a set of datasets from a database layer. As an example, the set of datasets is determined based at least in part on a test plan. For example, the set of datasets comprises datasets for tenants or environments against which tests are to be executed (e.g., as defined in the test plan, etc.). Obtaining the field definitions includes sending one more queries to the database layer for one or more field definitions for the set of datasets. In some embodiments, the system determines whether any field definitions for the set of datasets are stored in cache, and the system retrieves any field definitions for the datasets that are not already stored in cache. In some embodiments, the system obtains from the backend storage (e.g., the database layer) all the field definitions for all the datasets comprised in the set of datasets.

At 715, field definitions for the set of datasets are stored in a cache. According to various embodiments, in response to obtaining the one or more field definitions for the dataset, the system stores the field definitions in the cache. As an example, the system stores the retrieved field definitions in association 300 of FIG. 3. The system pre-fetches the one or more field definitions and stores the one or more field definitions before invoking generation of the test load (e.g., before sending a call to the database layer such as a query or a request to perform a computation, etc.).

At 720, a test is selected. In some embodiments, the system selects the test based at least in part on a user input or a test plan. For example, in response to a user inputting a selection of a test and an instruction to execute the test, the system selects the test based at least in part on the user input. As another example, the system determines the one or more tests comprised in the test plan, and the system selects a test from among the one or more tests of the test plan.

At 725, an environment against which test is to be executed is selected. In some embodiments, the system selects the environment against which test is to be executed based at least in part on a user input or a test plan. For example, in response to a user inputting a selection of an environment against which the test is to be executed, the system selects the environment based at least in part on the user input. As another example, the system determines one or more environments to be tested based on a definition in the test plan, and the system selects an environment from among the one or more environments of the test plan. Because different environments can have different configurations, performing a set of tests across varying environments enables the system to analyze performance of configurations and to identify optimal configurations and/or configurations that impede performance or that degrade over time.

In some embodiments, an environment is not selected. For example, if the system comprises a single environment, a selection of a particular environment is not performed. As another example, the selection of the environment is combined or implicit in the selection of a tenant.

At 730, a tenant of the selected environment against which the test is to be executed is selected. In some embodiments, the system selects the tenant of the environment against which a test is to be executed based at least in part on a user input or a test plan. For example, in response to a user inputting selection of a tenant against which the test is to be executed, the system selects the tenant based at least in part on the user input. As another example, the system determines one or more tenants to be tested based on a definition in the test plan, and the system selects a tenant from among the one or more tenants of the test plan.

At 735, a payload is generated based at least in part on a template and a set of field definitions corresponding to a dataset of the tenant. In some embodiments, the generating the payload corresponds to (or is similar to) 530 of process 500 of FIG. 5 or 640 or process 600 of FIG. 6.

At 740, the payload is used to cause a test load to be generated for the dataset of the tenant against which test is to be executed. In some embodiments, the use of the payload to cause the generation of the test load corresponds to (or is similar to) 540 of process 500 of FIG. 5 or 650 of process 600 of FIG. 6. For example, the payload is sent to a tenanted service hosting the dataset against which the test is to be executed. The tenanted service runs the query based at least in part on parameters included in the payload.

At 745, one or more performance characteristics are monitored with respect to execution of the test. In some embodiments, the system monitors performance of execution of the test load (e.g., by the target system). For example, the system monitors the performance of the target system handling the test load corresponding to the test. The system obtains one or more performance characteristics associated with the execution of the test load (e.g., the performing the query sent to the database layer).

At 750, a determination is made as to whether the selected test is to be executed against other tenants in the selected environment. In response to a determination that the test is not to be executed against another tenant of the selected environment at 750, process 700 proceeds to 755. Conversely, in response to a determination that the test is to be executed against another tenant of the selected environment at 750, process 700 returns to 730 and 730-745 are performed with respect to another tenant.

At 755, a determination is made as to whether the selected test is to be executed against another environment. In response to a determination that the test is not to be executed against another environment at 755, process 700 proceeds to 760. Conversely, in response to a determination that the test is to be executed against another environment at 755, process 700 returns to 725 and 725-750 are performed with respect to another environment.

At 760, a determination is made as to whether another test is to be executed. In response to a determination that another test is not to be executed at 760, process 700 proceeds to 765. Conversely, in response to a determination that another test is to be executed at 760, process 700 returns to 720 and 720-755 are performed with respect to another environment.

At 765, a report of performance characteristics for the executed test(s) is provided. According to various embodiments, the system provides a result of the test (e.g., the performing the query) to a user. For example, the system provides a report comprising at least one performance characteristic. As another example, the system analyzes the one or more performance characteristics relative to results of another test (e.g., results of the same test run by a different target system, or a different test run by the same target system, or both, etc.). For example, the system determines a benchmarking the target system across configurations, components, etc. In some embodiments, the system provides the analysis to a user such as via a user interface.

At 770, a determination is made as to whether process 700 is complete. In some embodiments, process 700 is determined to be complete in response to a determination that the test is complete, no further tests are to be performed (e.g., all tests in a test plan are complete, etc.), the user has exited the system, an administrator indicates that 700 is to be paused or stopped, etc. In response to a determination that process 700 is complete, process 700 ends. In response to a determination that process 700 is not complete, process 700 returns to 705.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain a template comprising one or more variables;
store, in a cache, a mapping of field definitions for a particular dataset;
populate, by the one or more processors, the template to generate a payload based at least in part on the mapping of field definitions for the particular dataset;
perform a query with respect to the particular dataset based at least in part on values obtained from the payload; and
monitor one or more performance characteristics associated with performing the query; and
a memory coupled to the one or more processors and configured to provide the one or more processors with instructions.

2. The system of claim 1, wherein populating the template based at least in part on the mapping of field definitions for the particular dataset comprises:
using the mapping of field definitions for the particular dataset to set the one or more variables in the template to one or more values.

3. The system of claim 1, wherein the one or more processors configured to:
determine one or more field definitions to use in connection with the template;
obtain a mapper library with respect to the particular dataset; and
extract values for the one or more field definitions in an order that is determined based at least in part on the template.

4. The system of claim 1, wherein the one or more processors configured to:
determine one or more field definitions to use in connection with the template;
read, from a backend storage, a table comprising a plurality of fields;
determine an order in which values for a subset of the plurality of fields are to be extracted; and
extract the values for the one or more field definitions in the order.

5. The system of claim 4, wherein the order in which values for the subset of the plurality of fields are to be extracted is determined based at least in part on a mapper library.

6. The system of claim 1, wherein performing the query comprises sending the payload to a tenanted service hosting the particular dataset, wherein the tenanted service runs the query based at least in part on parameters included in the payload.

7. The system of claim 1, wherein the payload corresponds to one or more predefined diagnostic tests to be run against the particular dataset.

8. The system of claim 1, wherein the one or more processors are further configured to:
configure the payload based at least in part on a tenant associated with the particular dataset.

9. The system of claim 1, wherein the one or more processors are further configured to:
obtain one or more credentials for the particular dataset, wherein the particular dataset is accessed using the one or more credentials in connection with performing the query with respect to the particular dataset.

10. The system of claim 9, wherein the one or more credentials are included in the payload, and the payload is provided to a tenanted service hosting the particular dataset.

11. The system of claim 1, wherein the one or more processors are further configured to:
   determine whether at least one performance characteristic of the one or more performance characteristics satisfies one or more statistical criteria; and
   in response to determining that the at least one performance characteristic satisfies the one or more statistical criteria, cause an administrator system to be alerted.

12. The system of claim 11, wherein causing the administrator system to be alerted comprises:
   communicating an indication that the at least one performance characteristic satisfies the one or more statistical criteria to a terminal associated with an administrator.

13. The system of claim 1, further comprising:
   an interface configured to:
      receive a request to perform a diagnostic with respect to generating a report for information stored in a database system; and
      provide a result of the diagnostic.

14. The system of claim 1, wherein the template corresponds to a predefined diagnostic test that is run against a plurality of datasets.

15. The system of claim 14, wherein the plurality of datasets comprises at least two datasets having different sizes.

16. The system of claim 14, wherein the plurality of datasets comprises at least two datasets being associated with different tenants.

17. The system of claim 14, wherein:
   a plurality of payloads are generated; and
   each of the plurality of payloads corresponds to a dataset among the plurality of datasets.

18. The system of claim 1, wherein the payload is generated and used to test performance of execution of the query by a configuration or environment associated with the particular dataset.

19. A method, comprising:
   obtaining, by one or more processors associated with a server, a template comprising one is or more variables;
   storing, in a cache, a mapping of field definitions for a particular dataset;
   populating, by the one or more processors, the template to generate a populated template based at least in part on the mapping of field definitions for the particular dataset;
   performing, by the one or more processors, a query with respect to the particular dataset using values obtained from the populated template; and
   monitoring, by the one or more processors, one or more performance characteristics associated with the performing the query.

20. A computer program product, the computer program product being embodied in a non-transitory computer readable medium and comprising computer instructions for:
   obtaining, by one or more processors associated with a server, a template comprising one or more variables;
   storing, in a cache, a mapping of field definitions for a particular dataset;
   populating, by the one or more processors, the template to generate a populated template based at least in part on the mapping of field definitions for the particular dataset;
   performing, by the one or more processors, a query with respect to the particular dataset using values obtained from the populated template; and
   monitoring, by the one or more processors, one or more performance characteristics associated with the performing the query.

* * * * *